Nov. 12, 1957  C. D. CROSBY  2,812,917
REAR VISION MIRROR SUPPORT
Filed July 2, 1954
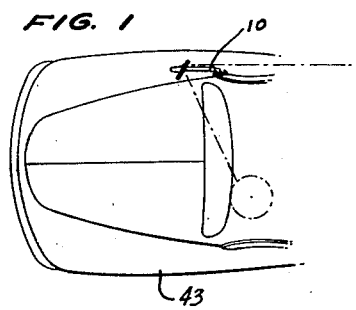
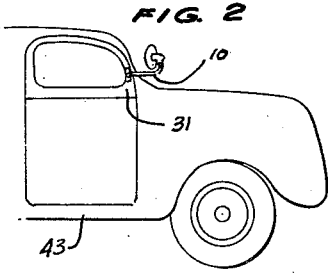
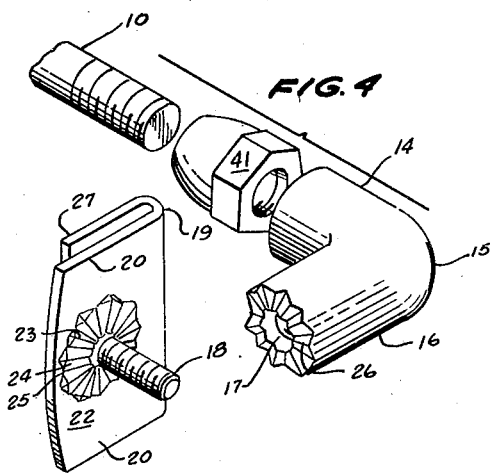
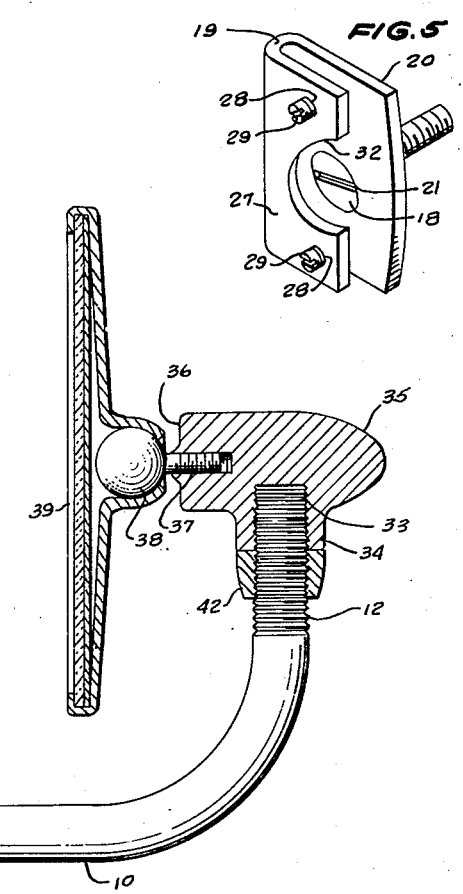
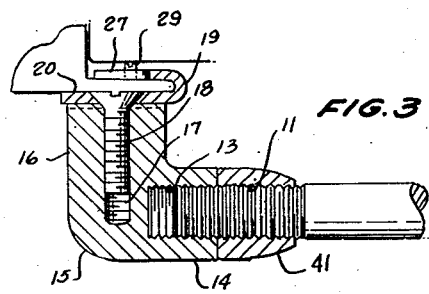
INVENTOR.
CLYDE D. CROSBY
BY
McMorrow, Berman & Davidson
ATTORNEYS

United States Patent Office 2,812,917
Patented Nov. 12, 1957

2,812,917

REAR VISION MIRROR SUPPORT

Clyde D. Crosby, La Plata, Mo.

Application July 2, 1954, Serial No. 441,130

1 Claim. (Cl. 248—276)

The present invention relates to rear vision mirrors for automotive vehicles and the like.

The principal object of the present invention is to provide a rear vision mirror support which may be used on either the right hand or the left hand side of the automobile, as desired.

Another object of the present invention is to provide a support for a mirror which is easily assembled and of simple construction, and one that is economical to manufacture and efficient in use.

A further object of the invention is to provide a support for a rear vision mirror which can be mounted on the flange of the automobile door without marring the door in any way, and one that may be adjustably positioned on the door flange with a variety of alternate positions so that any desired line of vision to the rear may be obtained, and on either side of the automobile.

Other and further objects and advantages of the present invention will become apparent from the following description when considered in connection with the accompanying drawings, in which:

Figure 1 is a top view of the present invention in place on the right hand side of an automobile, Figure 2 is a side view of the present invention in place on the right hand side of the automobile, Figure 3 is a side view partly in section showing the details of construction of the invention, Figure 4 is an exploded view in perspective showing the coacting positioning means, and Figure 5 is a detailed view in perspective of the clamp by which the invention is secured to the automobile door.

Referring to the drawing in more detail, in which like numerals indicate like parts throughout the several views, it will be seen that the invention consists of an arm 10 bent in a curve somewhat nearer one end than the other and having its ends 11 and 12 disposed at substantially right angles to each other.

The end 11 is threaded and is received in the threaded recess 13 in one leg 14 of the elbow member 15, the other leg 16 of which is also formed with a threaded bore 17 which receives the bolt 18. A clamping member 19 of U-shape has one leg 20 formed with a hole 21 for the bolt 18 and has on the outer surface 22 a star shaped positioning means 23 having alternating ridges 24 and valleys 25 which are matched by the corresponding positioning means 26 on the leg 16 of the elbow member 15. The clamping member 19 has its other leg 27 provided with tapped holes 28 for the set-screws 29 which secure it to the flange of the door 31 as seen in Figure 2. The leg 27 is also provided with a cutout portion 32 so that the bolt 18 may be reached by a screwdriver.

The arm's other end 12 is also threaded and is received in a recess 33 in the one leg 34 of the other elbow member 35, which has its other leg 36 bored and tapped to receive the stem 37 of the ball joint 38 which supports the mirror 39 in any position within the limited universal movement permitted by such a swivel connection.

A locking nut 41 and 42 is on each end of the arm 10 to fix the adjusted position of the arm 10 in the elbow member 15 and to fix the other elbow member 35 in its adjusted position on the arm 10.

As will be readily seen from the drawing, the clamping member 19 may be fitted to either the right hand door or the left hand door, and in the former position, as seen in Figures 1 and 2, the arm 10 may be either upwardly and inwardly curved or downwardly and inwardly curved, whichever position gives the best line of vision rearwardly along the side of the automobile 43 and depending upon the most desirable point of attachment to the door flange. If on the right hand door of a left hand drive automobile, the mirror will be viewed through the right hand portion of the windshield.

While a single embodiment of the present invention has been here shown and described, many other embodiments are contemplated and many changes and modifications may be made in this one preferred embodiment without departing from the spirit and scope of the present invention as set forth in the annexed claim.

What is claimed is:

A rear vision mirror for mounting on a vehicle door having a marginal flange, comprising an attaching member formed to a U-shape to straddle said flange and including means to clamp the member to the flange; a first elbow member formed with rigidly connected, perpendicularly related legs; means connecting one leg of the elbow member to the attaching member in selected positions of rotatable adjustment of the elbow member about the long axis of said one leg, including a screw rotatably seating in the attaching member, ridges formed on the attaching member radially of the screw, said one leg having a longitudinal, threaded recess receiving the screw, and ridges formed on said one leg radially of the recess and interlocking with the first ridges responsive to threading of the screw inwardly of the recess, in said selected positions of rotatable adjustment of the elbow member; an elongated arm having rigidly connected, perpendicularly related end portions one of which is coaxial with the other leg of the elbow member and is threaded, said other leg having a longitudinal, threaded recess receiving said one end portion; a jam nut threaded on said one end portion for engagement against said other leg in selected positions to which the arm is threaded into the recess of said other leg; a second elbow member including rigidly connected, perpendicularly related legs one of which is coaxial with the other end portion of the arm and has a threaded, longitudinal recess, said other end portion being threaded for engagement in the last named recess; a jam nut threaded on said other end portion for engagement against said one leg of the second elbow member in selected positions to which the second elbow member is turned upon said other end portion; and a reflecting panel having a universal connection to the other leg of the second elbow member.

References Cited in the file of this patent

UNITED STATES PATENTS

| | | |
|---|---|---|
| 2,128,187 | Kondrath | Aug. 23, 1938 |
| 2,165,689 | Trippe | July 11, 1939 |
| 2,299,280 | Reed | Oct. 20, 1942 |
| 2,510,436 | Trammell | June 6, 1950 |
| 2,600,893 | Mariani | June 17, 1952 |